United States Patent [19]

Ward et al.

[11] 4,089,351

[45] May 16, 1978

[54] FLEXIBLE METAL HOSE UNIT

[75] Inventors: Edward Anthony Ward, Leighton Buzzard; Leslie Charles Barron, Hemel Hempstead, both of England

[73] Assignee: Avica Equipment Limited, Hemel Hempstead, England

[21] Appl. No.: 663,581

[22] Filed: Mar. 5, 1976

[30] Foreign Application Priority Data

Mar. 7, 1975 United Kingdom .................. 9627/75

[51] Int. Cl.² ........................ F16L 11/11; F16L 11/14
[52] U.S. Cl. ........................................ 138/109; 285/84
[58] Field of Search .................. 285/256, 84, 125; 138/109

[56] References Cited

U.S. PATENT DOCUMENTS

| 2,019,540 | 11/1935 | Mascuch | 285/84 |
| 3,177,900 | 4/1965 | Sharp | 138/125 |

FOREIGN PATENT DOCUMENTS

| 1,549,540 | 11/1968 | France | 138/109 |

*Primary Examiner*—Robert I. Smith
*Attorney, Agent, or Firm*—Wood, Herron & Evans

[57] ABSTRACT

A flexible metal hose unit comprising in combination: a spigot formed with an annular flange and an annular gripping area, both coaxial with the spigot axis, a corrugated or helical flexible inner metal tube fitting over the spigot and welded to said flange, one or more flexible sheaths fitted over said gripping area, a ferrule comprising an annular member fitted over said sheath or sheaths and crimped or swaged onto the sheath or sheaths in an area radially corresponding to said gripping area.

3 Claims, 5 Drawing Figures

FLEXIBLE METAL HOSE UNIT

This invention concerns a flexible metal hose unit having a corrugated or helical inner metal tube, one or more outer protective or reinforcing sheaths which may but not necessarily be braided and an end connection. Such a hose will be hereafter referred to as "a hose unit of the type described".

This type of hose is commonly used for conveying liquids or gases at sub-zero or high temperatures and the construction is such that the, or each outer sheath serves primarily to resist the effects of end loads generated within the inner tube by internal pressure. The or each sheath also serve to damp out vibrations and/or resonance which may occur in the inner tube. It is clearly important to ensure that not only the inner tube is securely attached to the connection but also the or each sheath is securely attached to the connection.

In one form of hose unit of the type described a composite end connection is formed of three separate parts. The first part is an inner gripper part which has a helically formed inner surface shaped to conform to and to screw onto the helically corrugated outer surface of the inner tube. The second part is a ferrule which fits over the sheath which is pulled over the gripper part and is swaged thereto. The third part is a spigot which is inserted into the inner tube. The three parts are then welded together and also in the same weld to the sheath and inner tube. In such a unit the gripper part has to be carefully machined and is expensive to produce. In addition a single weld joins five component parts together.

According to the invention the gripper part is eliminated which provides a more economical connection.

The hose unit of the type described according to the invention consists in a spigot and ferrule which together form the end connection, the spigot being provided with a flange portion onto which the inner tube is welded and an annular gripping area onto which the or each sheath fits surroundingly, the ferrule being crimped or swaged over the or each sheath so as to press it onto the gripping area.

Preferably the gripping area is provided with an annular groove into which the or each sheath is crimped or swaged. The or each sheath may be formed as a metal braid. A second weld may be provided in the area where the or each sheath, spigot and ferrule co-abut. The spigot may be formed with a connection nipple or other connection means such as a screw thread.

The invention also resides in a method of forming a hose unit of the type described wherein the connection is provided with a spigot which is welded to the inner tube, the or each sheath is drawn over the spigot, and a ferrule forming a separate part of the connection is passed over the or each sheath and is crimped or swaged onto the spigot.

Preferably the connection is welded a second time in the area where the or each sheath, spigot and ferrule co-abut. Argon arc welding is preferably employed for the first or both welds.

The invention will now be further described with reference to the accompanying drawings which:

Figure 1:
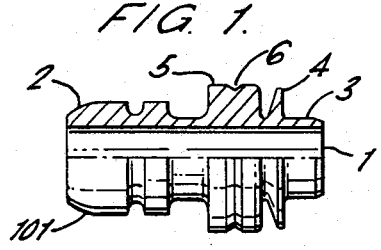
FIG. 1 is a partial cross-section of a spigot for the hose unit according to one example of the invention with a nipple connection.

In FIG. 1 of the drawings the spigot 101 for the end connection of the hose unit is shown, having a fluid duct 1 for conveying fluid from the hose to the article to which it is connected by a nipple connection portion 2. The spigot 101 has at the opposite end to the nipple connection portion 2, and coaxial with to the duct 1 a flat annular inner tube receiving portion 3, abutting on a flange portion 4. Between the inner tube receiving portion 3 and nipple connection portion 2 there is an annular gripping portion 5 which is preferably formed with a groove 6. Alternatively the groove may be replaced by a knurled or upstanding portion.

Figure 2:
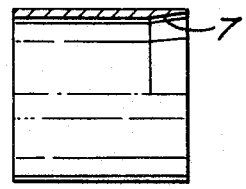
FIG. 2 is a partial cross-section of a ferrule for the hose unit of FIG. 1.

In FIG. 2 the ferrule for the connection is shown with an annular chamfered lead in portion 7.

Figure 3:
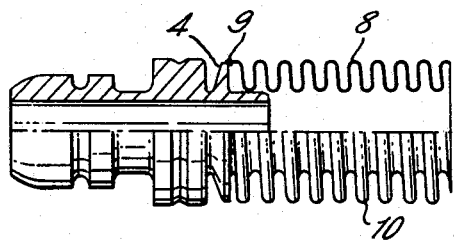
FIG. 3 is a partial cross-section of the spigot of FIG. 1 joined to an inner tube.

In FIG. 3 the spigot 101 of FIG. 1 is shown inserted into the corrugated inner tube and welded by argon arc welding to the inner tube 8 at a first weldment at a point 9 at the end of the inner tube and onto the flange portion 4 of the spigot. The corrugations 10 are shown as helical corrugations, but they can also be separate annular corrugations.

At this stage of forming the hose unit the sub-assembly so formed by the inner tube and spigot is examined for satisfactory welding and checked for leakage.

Figure 4:
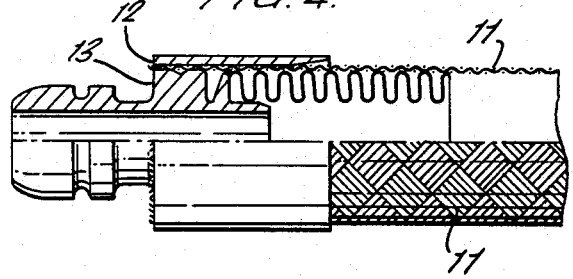
FIG. 4 is a partial cross-section of the spigot and ferrule of FIGS. 1 and 2 joined to the inner tube of FIG. 3 and a sheath.
Figure 5:
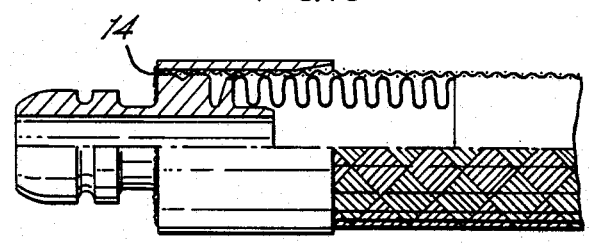
FIG. 5 is a partial cross-section of the completed hose unit according to the invention.

In FIG. 4 the next stage of assembly is shown where the sheath 11 formed from metal braid has been drawn over the spigot and the ferrule shown in FIG. 2 pushed over the sheath. In the next stage of assembly the braid is trimmed level with the outer end 12 of the ferrule and outer face 13 of the gripping portion 5.

In FIG. 4 the completely assembled hose unit is shown with the ferrule swaged with a precisely determined pressure to a predetermined dimension onto the spigot so that the sheath 11 is tightly forced into the groove 6. This precisely controlled swaging operation creates a precise grip of the outer sheath 11 on the inner tube 8 to resist movement of the tube 8 caused by pressure impulses and fluctuations and vibration, and to increase resistance to fatigue of the inner tube, in particular at the welded junction 9 between tube 8 and spigot 101. The final action of assembly is to weld the ferrule, spigot and sheath together by argon arc welding a second weldment at at the point 14.

The assembly of the component parts is arranged so that leaks can be tested before being covered with the metal braid and ferrule. The final weld provides a high integrity attachment and avoids the hazard of the braid partially or completely pulling out of the ferrule which could occur with a non-welded ferrule. Such pulling out or relaxation would cause stresses in the inner tube and could cause a hazard in a fire zone.

We claim:
1. A flexible metal hose unit comprising
   a spigot formed with an annular flange and an annular gripping area, said flange and said gripping area being coaxial with the axis of said spigot,
   a corrugated flexible inner metal tube fitted over said spigot adjacent said flange,
   a first weldment connecting said flange and said metal tube in sealing relation one with the other, said weldment thereby connecting said spigot and said metal tube, at least one flexible sheath surrounding said metal tube and at one end fitted over said gripping area, said sheath being formed of a metal braid, an annular ferrule fitted over said sheath in said gripping area, said ferrule being crimped onto said sheath in an area radially corresponding to said gripping area, said ferrule thereby connecting said sheath and said spigot, and a second weldment connecting said metal sheath, said spigot and said ferrule one with the other.

2. A hose unit as claimed in claim 1 wherein said gripping area is provided with an annular groove into which said sheath is crimped.

3. A hose unit as claimed in claim 1 including connection means formed integral with said spigot.

* * * * *